(No Model.) 2 Sheets—Sheet 1.
R. E. DIMICK.
SAW SWAGE.
No. 504,124. Patented Aug. 29, 1893.
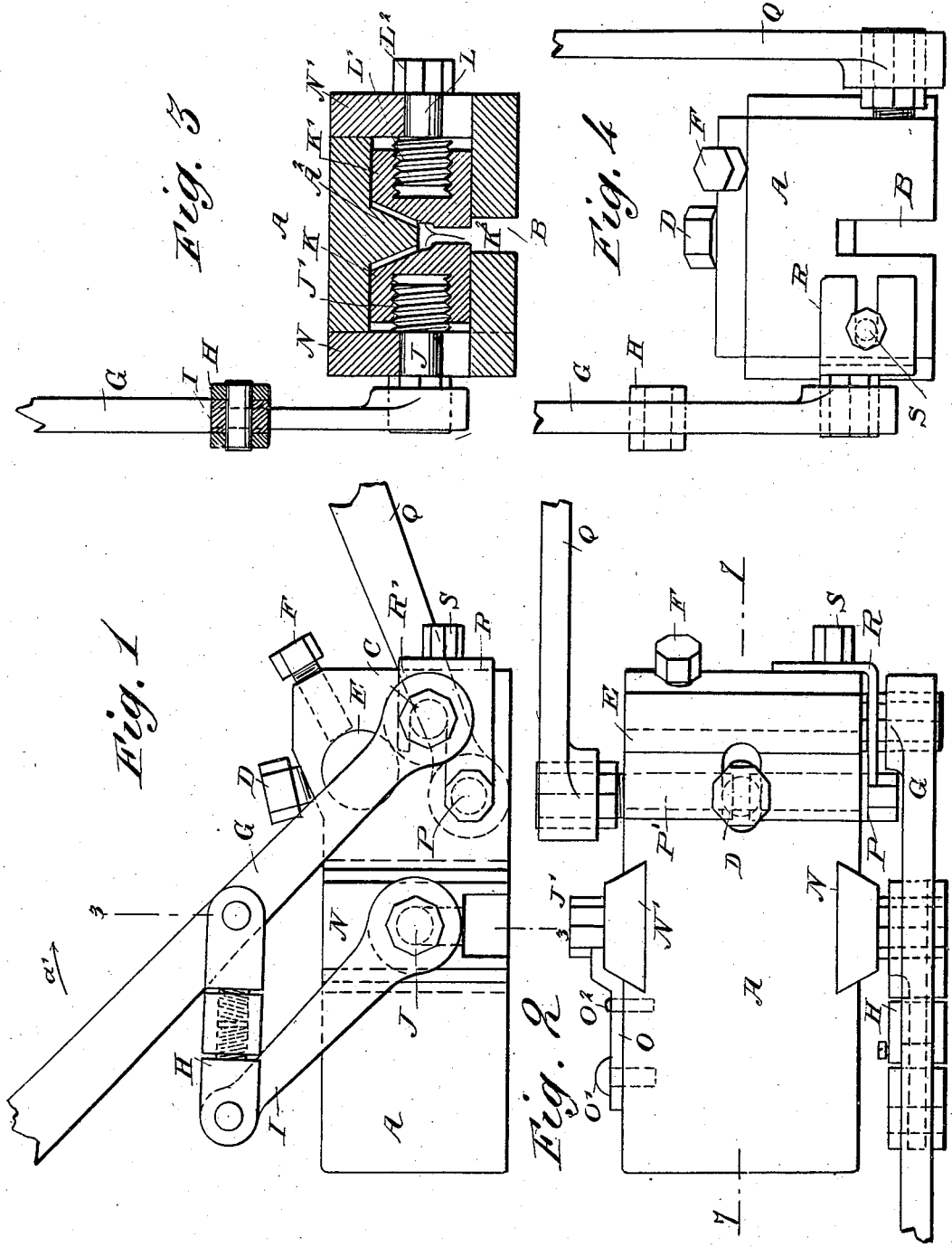
WITNESSES:
C. Neveux
C. Sedgwick
INVENTOR
R. E. Dimick
BY Munn & Co
ATTORNEYS.

(No Model.) 2 Sheets—Sheet 2.
R. E. DIMICK.
SAW SWAGE.
No. 504,124. Patented Aug. 29, 1893.
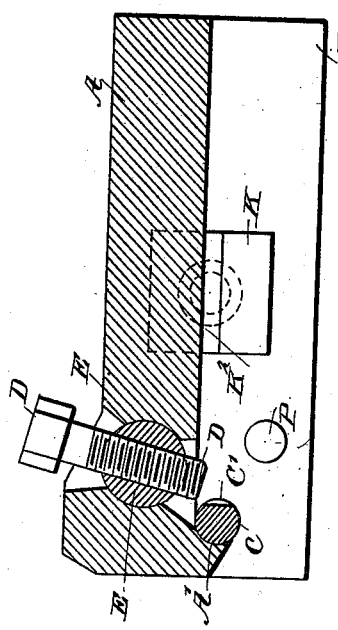
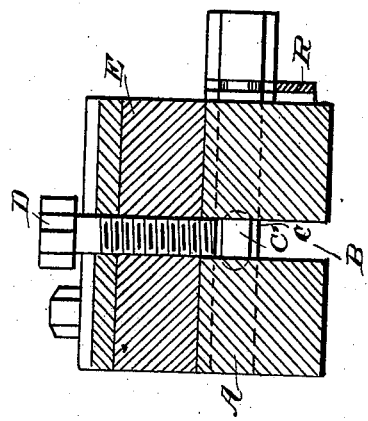
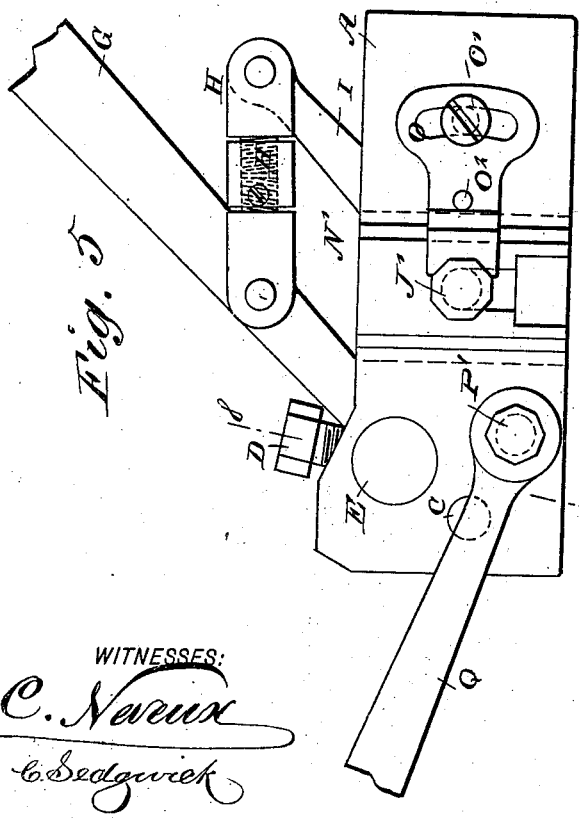
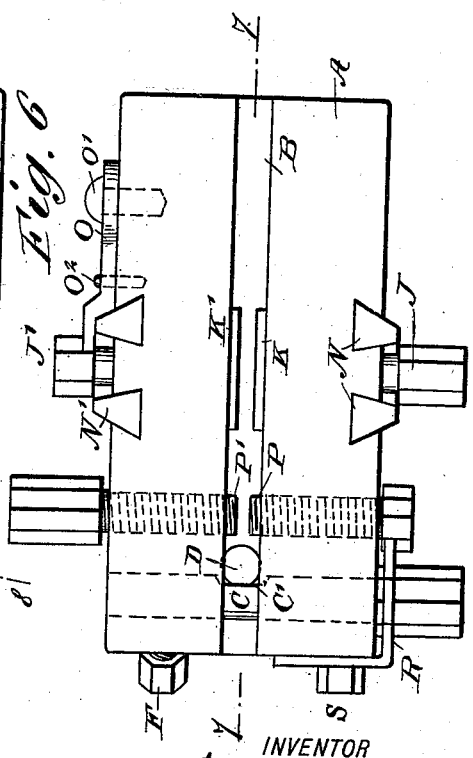
WITNESSES:
C. Neveux
C. Sedgwick
INVENTOR
R. E. Dimick
BY Munn & Co
ATTORNEYS.

UNITED STATES PATENT OFFICE.

RICHARD ERNEST DIMICK, OF RHINELANDER, WISCONSIN, ASSIGNOR OF ONE-HALF TO WEBSTER EVERETT BROWN, OF SAME PLACE.

SAW-SWAGE.

SPECIFICATION forming part of Letters Patent No. 504,124, dated August 29, 1893.

Application filed February 11, 1893. Serial No. 461,860. (No model.)

*To all whom it may concern:*

Be it known that I, RICHARD ERNEST DIMICK, of Rhinelander, in the county of Oneida and State of Wisconsin, have invented a new and Improved Saw-Swage, of which the following is a full, clear, and exact description.

The object of the invention is to provide a new and improved saw swage, which is simple and durable in construction, very effective in operation, and arranged to swage a tooth and simultaneously dress another tooth behind to the proper size at each operation of the swage.

The invention consists of parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a plan view of the same. Fig. 3 is a transverse section of the same on the line 3—3 of Fig. 1. Fig. 4 is an end view of the same. Fig. 5 is a rear side elevation of the same. Fig. 6 is an inverted plan view of the same. Fig. 7 is a longitudinal section of the same on the line 7—7 of Fig. 6; and Fig. 8 is a transverse section of the same on the line 8—8 of Fig. 5.

The improved saw swage is provided with the swage block A formed on its under side with a longitudinally-extending slot B, for the passage of the saw teeth adapted to be operated on by the swage die C, extending transversely and mounted to turn in the block A, the part of the die in the slot B being formed with a flattened surface C' for engagement with the tooth. Part of the block is extended into the slot B in the rear of the die C, as plainly shown in Fig. 7, so that this extension forms a seat A' for the swage die C to prevent the latter from being bent or otherwise injured during the process of swaging. The swage die C operates in conjunction with the swage anvil D made in the shape of a screw, screwing in a transversely-extending shaft E mounted to turn in suitable bearings in the block A and adapted to be held in place when adjusted by a set screw F. It will be seen that when the set screw F is loosened the shaft E carrying the anvil D can be turned in its bearings, so as to move the anvil D into the desired angular position relative to the backs of the teeth. At the same time the anvil D can be screwed up or down in the shaft E, so as to bring its lower end nearer to or farther from the die C according to the point at which the tooth is to be swaged. When the anvil has been adjusted in the shaft E and the latter set to hold the anvil in proper position relative to the die C, then the set screw F is screwed up to fasten the shaft E in place on the block A. On one outer end of the die C is secured a hand lever G adapted to be taken hold of by the operator, to turn the said die C to swage the tooth in conjunction with the anvil D. The hand lever G is pivotally-connected by an adjustable link H with an arm I held on the outer end of a shaft J formed at its inner end with the threads J' screwing in the dressing die K mounted to slide laterally in suitable bearings formed in the block A, the inner face of the dressing die extending into the slot B to engage the respective tooth previous to swaging the same, as hereinafter more fully described. Opposite this dressing die K is arranged a similar dressing die K', also mounted to slide transversely in the block A and adjusted laterally by a screw L' formed on a shaft L adapted to be turned at its outer square end $L^2$ by a suitable tool placed on the said end $L^2$. The said shafts J and L, are mounted to turn in slides N and N', respectively, fitted to slide vertically in suitable guideways formed in the sides of the swage block A, as plainly shown in Figs. 2 and 6.

In order to lock the shaft L in position after it has been turned to adjust its dressing die K', I provide a keeper O, pivoted to the block A, at $O^2$, and adapted to be held to the block A, by a screw O', and provided with an oblong hole through which the screw O' passes, one end of the keeper fitting the polygonal head of the shaft J'. Two oppositely arranged clamps P and P' screw into the swage block A between the die C and the dressing dies K, K'. The polygonal head of the clamp P' is engaged by a lever Q under the control of the operator to turn the said screw clamp to move the same against one side of the saw blade to press the latter in contact with the other clamp P, thereby clamping the saw blade in position in the swage block A. The other clamp P is screwed so as to adjust it according to the thickness of the saw blade, and when the said clamp has been set, it is locked in position at its outer polygonal head by a keeper R secured by a set screw S to the block A, as plainly illustrated in the drawings. This keeper R is provided with an offset R' engaging an annular groove in the swage die C, so that the latter may be set out and in, and to prevent it from shifting laterally in its bearings; see Fig. 1.

As illustrated in Fig. 3, each of the dressing dies K and K' is formed at its inner face with a recess or crease $K^2$ to receive the point of the respective saw tooth, and the upper ends of the faces of the said dies are beveled to permit of extending part $A^2$ of the block A between the said dies, thus avoiding a complete transverse cut for the said dies in the block A and a consequent weakening of the said block. This arrangement permits the dies to close sufficiently onto the teeth, but leaves the part $A^2$ projecting down a sufficient distance to meet the top of the tooth, thus preventing the point from being bent upward when the dies are pressed or set on the tooth.

The operation is as follows: The swage block A is placed on the saw blade by engaging the swage block at its longitudinal slot B with that part of the saw to be swaged and then the operator swings the lever Q back so as to move the clamp P' inward to fasten the saw blade between the two clamps. The operator then imparts a swinging motion to the hand lever G in the direction of the arrow $a'$, so that the die C is turned and swages the tooth on the anvil D, and at the same time the lever G imparts a swinging motion to the lever I by the link H so that the dressing die K is moved inward onto the tooth behind the swage die, whereby the tooth in the rear is dressed at the time the other tooth is swaged. When this has been done, the operator swings the lever G backward to its normal position and then swings the lever Q forward to release the saw, the block then being moved forward to place the previously swaged tooth into position for the dies K and K', while a new tooth is presented to the swaging die C and anvil D. The above described operation is then repeated, that is, the saw is first clamped by swinging the lever Q back, after which the lever G is swung forward to actuate the die C and the dressing die K. The link H can be lengthened or shortened to keep the dressing dies in line with the clamping screws P, and to regulate the width to which the tooth is dressed. In case the link H is lengthened the die on that side will not go in so far and if shortened will go in farther, while the swage die will be turned the same distance. The arrangement also admits of regulating the width to which the tooth is dressed by the dies K K'.

Having thus fully described my invention, I claim as new and desire to secure by Letters Patent—

1. In a saw swage, the combination, with a swage block having a slot, of a swage die mounted to turn in the said block, a stationary anvil located in proximity of the swage die, and a shaft carrying the said anvil and capable of turning in the said block for effecting the angular adjustment of the anvil, the latter being also capable of being adjusted to protrude more or less from the said shaft, substantially as shown and described.

2. In a saw swage, the combination, with a swage block having a slot, of a swage die mounted to turn in the said block, a stationary anvil located in proximity of the swage die, a shaft carrying the said anvil and capable of turning in the said block for effecting the angular adjustment of the anvil, the latter being also capable of being adjusted to protrude more or less from the said shaft, and means for fastening the said shaft in position, substantially as shown and described.

3. In a saw swage, the combination, with a swage block having a slot, of a swage die mounted to turn in the said block and having a flattened portion within the said slot, a stationary anvil located in proximity to the swage die, and a shaft carrying the said anvil and capable of turning in the said block, for effecting the angular adjustment of the anvil, the latter being also capable of being adjusted to protrude more or less from the said shaft substantially as shown and described.

4. In a saw swage, the combination, with a swage block having a slot, of a swage die mounted to turn in the said block and having a flattened portion within the said slot, a stationary anvil located in proximity of the swage die, a shaft carrying the said anvil and capable of turning in the said block, for effecting the angular adjustment of the anvil, the latter being also capable of being adjusted to protrude more or less from the said shaft and a set screw for fastening the said shaft in place, substantially as shown and described.

5. In a saw swage, the combination with a swage block, of a swage die mounted to turn in the said block, an anvil adjustably held in the said block, and oppositely arranged dressing dies actuated simultaneously with the said swage die, to dress one tooth while another tooth is swaged, substantially as shown and described.

6. In a saw swage, the combination with a swage block, of a swage die mounted to turn in the said block, an anvil adjustably held in the said block, oppositely arranged dressing dies actuated simultaneously with the said swage die, to dress one tooth while another tooth is swaged, and intermediate mechanism to connect the said swage die with the said dressing dies, substantially as shown and described.

7. In a saw swage, the combination, with a swage block, of a pair of slides fitted to slide vertically in the sides of the swage block, screw shafts mounted to turn in the said slides, a pair of dressing dies fitted to slide transversely in the swage block and each connected with the inner end of one of the screw shafts, means for turning one of the said screw shafts to move its dressing die toward or from the other dressing die, and means for locking the other screw shaft in place after it is adjusted, substantially as shown and described.

8. In a saw swage, the combination, with a swage block, of a pair of slides fitted to slide vertically in the sides of the swage block, screw shafts mounted to turn in the said slides, a pair of dressing dies fitted to slide transversely in the swage block and each provided with a threaded end to engage the thread at the inner end of one of the screw shafts, means for turning one of the said screw shafts to move its dressing die toward or from the other dressing die, and means for locking the other screw shaft in place after it is adjusted, substantially as shown and described.

RICHARD ERNEST DIMICK.

Witnesses:
C. F. DILLETT,
D. H. WALKER.